UNITED STATES PATENT OFFICE.

WILLIAM PFITZINGER, OF ELBERFELD, GERMANY, ASSIGNOR TO THE FARBENFABRIKEN, VORMALS FR. BAYER & CO., OF SAME PLACE.

YELLOW DYE.

SPECIFICATION forming part of Letters Patent No. 446,009, dated February 10, 1891.

Application filed October 31, 1890. Serial No. 369,948. (Specimens.) Patented in Germany April 28, 1889, No. 53,935, and in France June 7, 1889, No. 198,786.

*To all whom it may concern:*

Be it known that I, WILLIAM PFITZINGER, chemist, and assignor to the FARBENFABRIKEN, VORMALS FR. BAYER & CO., of Elberfeld, a subject of the Emperor of Germany, residing at Elberfeld, Prussia, Germany, have invented a new and useful Improvement in the Manufacture of New Yellow Substantive Coloring Matters, (for which the FARBENFABRIKEN, VORMALS FR. BAYER & CO., have obtained Letters Patent No. 53,935 in Germany, dated April 28, 1889, and in France dated June 7, 1889, No. 198,786;) and I do hereby declare the following to be a full and exact description of the invention.

My invention relates to the manufacture of a substantive or direct dyeing coloring-matter by combining the diazo compound of the thio derivatives of paratoluidine sulpho-acid, called "dehydrothiotoluidine sulpho-acid," (Gattermann, Jacobsen, Ber. XXII, pages 330 to 342,) or primuline, (thioparatoluidine, Letters Patent No. 406,952, dated July 16, 1889,) with the sulpho-acid of the same thio derivative of the paratoluidine, or by boiling the diazo compound of the dehydrothiotoluidine sulpho-acid or primuline with ammonia, which I regard as an equivalent process.

In carrying out my invention practically I proceed as follows: Ten (10) pounds of the soda salt of thioparatoluidine sulpho-acid (dehydrothiotoluidine sulpho-acid or primuline) are dissolved in water and converted in the well-known manner with nitrate of soda and hydrochloric acid into the diazo compound. This is poured under continuous stirring into an acetic solution of ten (10) pounds of a like thioparatoluidine sulpho-acid salt. A deep dark precipitate is formed, which, after standing for some days, by raising slowly the temperature from 20° to 60° centigrade, turns to a clear orange shade. If it dissolves with a fine yellow color when boiled with alkaline water, the mixture is neutralized with sodium carbonate, salted out with common salt, filtered, and dried.

Instead of an acetic-acid solution, alkaline solutions may be employed to form the dye-stuff. The same dye-stuff will be obtained by boiling the diazo compound of the thioparatoluidine sulpho-acid with ammonia.

My new dye-stuff thus obtained forms a yellow amorphous powder, dissolving easily in cold water, giving a bright greenish-yellow solution, which turns red by adding acetic acid, and gives a red precipitate by adding mineral acid. With concentrated sulphuric acid, first a weak yellow solution is formed, which, after some time decolorizes under destruction of the dye-stuff. The same destruction under development of nitrogen is obtained by boiling the watery solution of the dye-stuff with diluted mineral acid.

My new coloring-matter dyes unmordanted cotton in a boiling soap bath a clear greenish yellow.

Having thus described my invention, what I claim, and desire to secure by Letters Patent, is—

1. The coloring-matter herein described, derived from thioparatoluidine sulpho-acid, and which has the following properties: it is easily soluble in water with a clear greenish-yellow color, turning red on the addition of acetic acid, precipitating as a red powder by adding mineral acid; it is destroyed by concentrated sulphuric acid or boiling diluted mineral acid with development of nitrogen, and it dyes unmordanted cotton a bright greenish yellow in an alkaline soap bath.

2. The process herein described of forming a new coloring-matter by treating the diazo compound of thioparatoluidine sulpho-acid with the sulpho-acid of the same thio derivative of the paratoluidine, substantially as described.

WILLIAM PFITZINGER.

Witnesses:
  WM. A. POLLOCK,
  C. R. FERGUSON.